Patented May 26, 1953

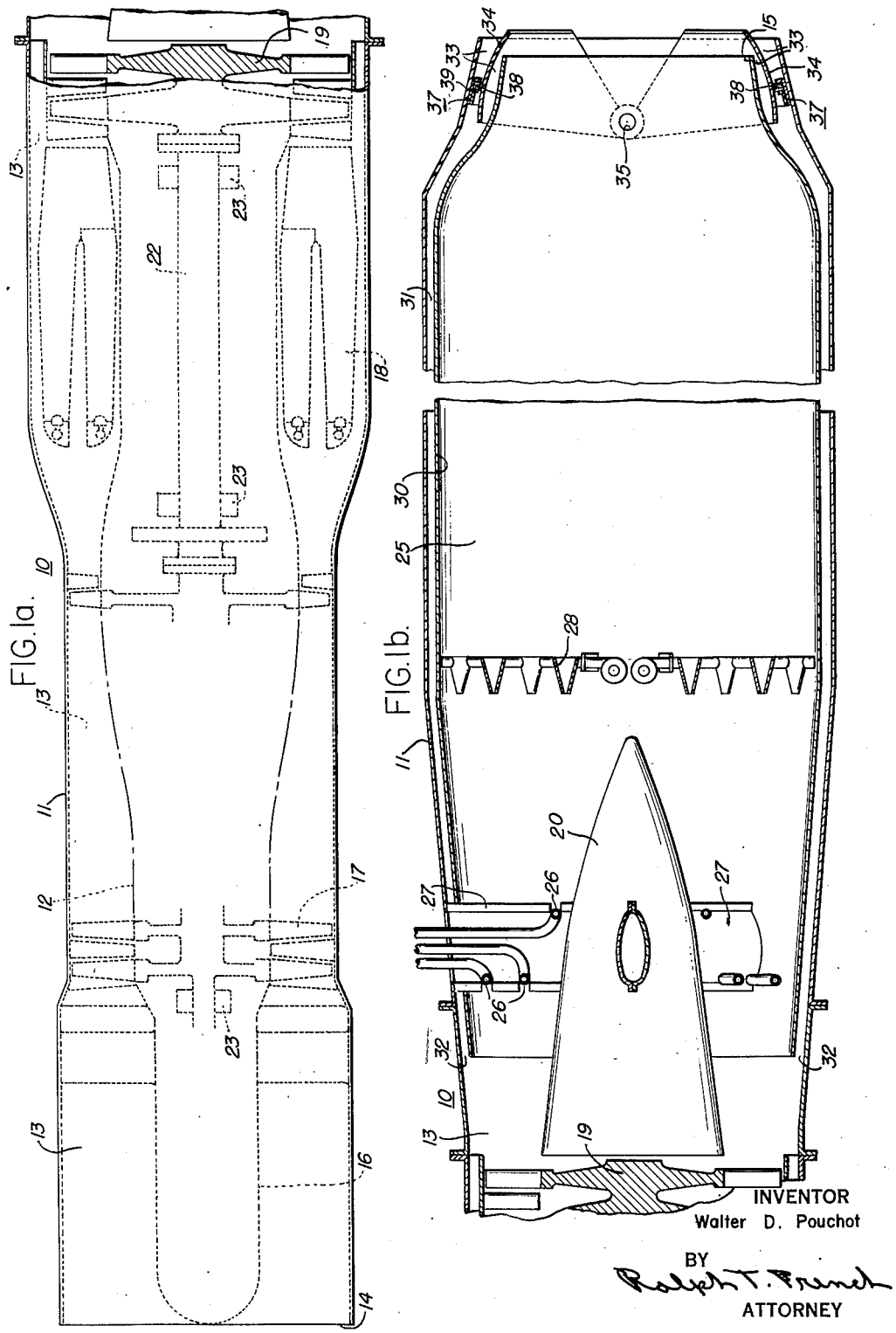

2,639,578

UNITED STATES PATENT OFFICE 2,639,578

COMBUSTION PRODUCTS REACTION MOTOR WITH VARIABLE AREA EXHAUST NOZZLE

Walter D. Pouchot, Prospect Park, Pa., assignor to Westinghouse Electric Corporation, East Pittsburgh, Pa., a corporation of Pennsylvania Application March 30, 1950, Serial No. 152,885

3 Claims. (Cl. 60—35.6)

This invention relates to power plants for jet propulsion of aircraft, more particularly to such power plants which are equipped with eyelid-type variable area exhaust nozzles, and has for an object to provide improved apparatus of this character.

While not limited thereto, the present invention is particularly useful with jet propulsion power plants equipped with afterburners, where the exhaust gas temperatures may be upwards of 3000° F.

Two serious problems encountered with this type of apparatus are (1) a satisfactory seal between the fixed and movable parts of the nozzle to prevent "blow-by" or "blow-back" and (2) destruction of the nozzle from burnouts or cracking.

Cracks appear to be caused chiefly by fluttering of parts in the high velocity gas stream. The burnouts occur most frequently when both sides of a nozzle wall are subject to the exhaust gases, but may be caused by a stagnant gas on one side of the wall and exhaust gases on the opposite side, or where two thicknesses of metal, such as overlapping flaps, are used.

On most previous designs of variable area exhaust nozzles it has been necessary to provide a good seal between the fixed and movable parts, first to reduce leakage, and second, to prevent flow of very hot gases on both sides of the nozzle walls.

The present invention provides a variable area exhaust nozzle construction which eliminates or reduces the above-mentioned and other undesirable conditions and results.

Accordingly, another object of the invention is to provide a variable area nozzle construction wherein hot exhaust gases flow in contact with one surface only of the nozzle.

A further object of the invention is to provide a variable area exhaust nozzle construction wherein the nozzle-adjusting elements are disposed in the flow path of cooling gases.

Yet another object of the invention is to provide a variable area exhaust nozzle construction wherein a seal between the nozzle-adjusting elements and a surrounding fixed casing is so constructed and arranged that any leakage of gases therepast is in the same direction as the propulsive jet through the nozzle.

These and other objects are effected by the invention as will be apparent from the following description and claims taken in connection with the accompanying drawing, forming a part of this application, in which:

Fig. 1a is a side elevational view of the forward half of a gas turbine power plant incorporating the present invention; and, Fig. 1b is a longitudinal sectional view through the rear or aft half of the power plant shown in Fig. 1a.

The power plant 10, shown for purposes of illustration only, comprises an annular outer casing 11 and an inner composite core structure 12 coaxial therewith, the two being radially spaced to provide therebetween an annular passage 13 for flow of air and gases substantially straight through from an inlet 14 at the front, or left as viewed in Fig. 1a, to an exhaust nozzle 15 at the rear or opposite end.

The composite core structure may include a fairing cone 16 at the inlet end, an axial-flow compressor 17, primary combustion apparatus 18, a gas turbine 19 and a diffuser core 20. The turbine 19 may be connected to the compressor 17 and drive the latter through shaft 22 journaled in suitable bearings 23.

A power plant of this type operates in accordance with well-known principles which may be summarized as follows: Air entering the inlet 14 is compressed by the compressor 17 and passes to the combustion apparatus 18 where its temperature is raised by combustion of fuel therein. The heated air and hot products of combustion are expanded through the blading of the turbine 19 to motivate the latter and therethrough the compressor 17, the exhaust from the turbine being discharged from the power plant through the exhaust nozzle 15 in the form of a jet for propelling the aircraft in, or on which, the power plant is mounted.

In the illustrated construction the downstream portion of the outer casing 11 between the turbine 19 and the exhaust nozzle 15 is elongated to provide an afterburner combustion chamber 25 to which fuel is supplied through fuel rings 26 supported by radial struts 27 which likewise support the diffuser core 20 from the outer casing 11. Suitable flame holding apparatus may be provided downstream of the point of fuel admission, as at 28.

The combustion chamber 25 is defined by an inner casing 30 coaxial with the outer casing 11 and radially spaced therefrom to provide an annular passage 31 therebetween for flow of relatively cool gases from the inlet of the passage, at 32, to the outlet thereof, at 33.

Control of the effective area of the exhaust nozzle 15 is effected by movement of a pair of segmental nozzle-restricting elements 34 pivotally mounted on the casing, as at 35, and housed in the annular flow passage 31 between the inner and outer casings.

An annular sealing structure, indicated in its entirety by the reference character 37, is fixedly secured to the inner surface of the outer casing by suitable means, for example, welding, and includes a sealing element 38 carried by the metallic support 39, the sealing element 38 having sliding engagement with the movable nozzle-regulating elements 34.

It will be apparent from consideration of Fig. 1b that with the seal structure 37, located as indicated, substantially all of the cooling gases flowing through the annular passage 31 are caused to exit through the exhaust space between the nozzle-regulating elements 34 and the inner casing nozzle portion 15 with the result that both the nozzle 15 and the elements 34 are maintained at a reasonable temperature. Furthermore, any gases leaking past the sealing structure 37 discharge in a direction aiding the propulsion effect of the main jet.

While, in the construction illustrated, the cooling gases for the annular passage 31 are supplied from the turbine outlet, it will be apparent that they may be obtained from any other suitable source, for example, the compressor outlet or the annular flow path 13 between the compressor outlet and the turbine inlet.

While the invention has been shown in but one form, it will be obvious to those skilled in the art that it is not so limited, but is susceptible of various changes and modifications without departing from the spirit thereof.

What is claimed is:

1. In a power plant for jet propulsion of aircraft, a tubular inner casing defining a combustion chamber terminating in an exhaust nozzle; means for supplying a mixture of fuel and gases to said combustion chamber for combustion therein and exit therefrom through the exhaust nozzle as a propulsive jet; a tubular outer casing encompassing the inner casing and spaced radially therefrom to define therebetween a circumferentially-continuous flow path for cooling gases; a plurality of nozzle-restricting elements mounted in said flow path, inwardly of said tubular outer casing and outwardly of said tubular inner casing, and movable between a first position where the exhaust nozzle area is unrestricted and a second position where the effective area of the exhaust nozzle is materially reduced; and means sealing the space between the nozzle-restricting elements and the outer casing, whereby cooling gases flowing through the circumferentially-continuous flow path exit therefrom between said nozzle-restricting elements and the exhaust nozzle.

2. In a power plant for jet propulsion of aircraft, a tubular inner casing defining a combustion chamber terminating in an exhaust nozzle; a tubular outer casing encompassing the inner casing and spaced radially therefrom to define therebetween a circumferentially-continuous flow path for cooling gases; a plurality of nozzle-restricting elements mounted in the said flow path inwardly of said tubular outer casing and outwardly of said tubular inner casing for pivotal movement between a first retracted position where the nozzle effective area is maximum and a second extended position where the nozzle effective area is materially reduced, said nozzle-restricting elements being spaced from both the inner and outer casings; and means sealing the space between the nozzle-restricting elements and the outer casing, whereby cooling gases moving through the circumferentially-continuous flow path are forced to exit therefrom through the space between the nozzle-restricting elements and the inner casing.

3. Structure as specified in claim 2, wherein the sealing means is fixedly secured to the inner surface of the outer casing and has sliding contact with the outer surfaces of the nozzle-restricting elements.

WALTER D. POUCHOT.

References Cited in the file of this patent

UNITED STATES PATENTS

| Number | Name | Date |
|---|---|---|
| 2,259,171 | Miller | Oct. 14, 1941 |
| 2,508,420 | Redding | May 23, 1950 |